United States Patent
Saito et al.

[11] Patent Number: 5,960,371
[45] Date of Patent: Sep. 28, 1999

[54] METHOD OF DETERMINING DIPS AND AZIMUTHS OF FRACTURES FROM BOREHOLE IMAGES

[75] Inventors: Naoki Saito, Davis, Calif.; Nicholas N. Bennett, North Haven; Robert Burridge, Bethel, both of Conn.

[73] Assignee: Schlumberger Technology Corporation, Ridgefield, Conn.

[21] Appl. No.: 08/923,610

[22] Filed: Sep. 4, 1997

[51] Int. Cl.[6] .................................................. G06F 19/00
[52] U.S. Cl. ............................................. 702/11; 702/10
[58] Field of Search ...................... 702/9–13; 73/152.15, 73/152.16; 367/35, 69, 86, 73

[56] References Cited

U.S. PATENT DOCUMENTS 3,069,654  12/1962  Hough .
5,162,994  11/1992  Torres .

OTHER PUBLICATIONS

Hayman, A.J., Phillipe Parent, Philip Cheung, and Patrick Verges, Improved Borehole Imaging by Ultrasonics *Soc. of Petr. Eng.*, SPE 28440, pp. 977–992. (Sep. 25–28, 1994).

Safinya, K.A., P. Le Lan, M. Villegas, and P.S. Cheung, "Improved Formation Imaging with Extended Microelectrical Arrays," *Soc. of Petr. Eng.*, SPE 22726, pp. 653–664 (Oct. 6–9, 1991).

*Primary Examiner*—Donald E. McElheny, Jr.
*Attorney, Agent, or Firm*—Keith G.W. Smith; Mark Levy

[57] ABSTRACT

A borehole image interpretation method that utilizes a Hough transform technique is described. The method can detect planar structures such as fractures and formation beddings in the borehole, as well as geometric patterns such as elliptical vugs.

13 Claims, 4 Drawing Sheets

ND OF DETERMINING DIPS AND
AZIMUTHS OF FRACTURES FROM
BOREHOLE IMAGES

METHOD OF DETERMINING DIPS AND AZIMUTHS OF FRACTURES FROM BOREHOLE IMAGES

FIELD OF THE INVENTION

The present invention relates to a method for extracting dips and azimuths of multiple fractures automatically from any type of borehole image and, more particularly, to a method for obtaining dips and azimuths from images obtained by Ultrasonic Borehole Imaging (UBI) or Fullbore Formation MicroImaging (FMI) techniques.

BACKGROUND OF THE INVENTION

Recent well logging techniques have become very sophisticated. Ultrasonic detection and nuclear magnetic imaging are now commonplace. Despite the many advances in detection methods, the interpretations of the results are often cumbersome, laborious, or somewhat inaccurate.

One of the more time consuming evaluations involves the interpretation of reflection amplitude images obtained by an Ultrasonic Borehole Imaging (UBI) tool, or electrical conductivity images obtained by a Fullbore Formation Micro-Imaging (FMI) tool. For a detailed description of UBI and FMI tools and techniques, see: Hayman, A. J., Phillipe Parent, Philip Cheung, and Patrick Verges, "Improved Borehole Imaging by Ultrasonics," Soc. of Petr. Eng., SPE 28440, pp. 977–992 (25–28 Sep. 1994); and Safinya, K. A., P. Le Lan, M. Villegas, and P. S. Cheung, "Improved Formation Imaging with Extended Microelectrical Arrays," Soc. of Petr. Eng., SPE 22726, pp. 653–664 (6–9 Oct. 1991), respectively. One of the problems with these detection methods is the difficulty in rapidly and easily characterizing fractures, formation dips, and other events in reservoir regions.

Extraction of dips and azimuths of fractures and formation beddings in the workstation environment is a tedious effort. A planar dipping event (e.g., a planar fracture, or a planar bed boundary) can be represented on borehole images as a sinusoid with one period, when unrolled and displayed on the workstation.

A typical borehole image containing such sinusoids is completely specified by its amplitude and phase, which are functions of dip angle and azimuth of the planar event. Often, the geologist must fit best sinusoids on the borehole images interactively. This process is labor intensive. One present day method of doing this is to choose several points along these sinusoidal features, and then fit the best sinusoids based on the chosen points. Another current procedure is to modify amplitudes and phase of sinusoids interactively on the workstation until a satisfactory fit is obtained.

It would be desirable to have a method of instantaneously or quickly interpreting this information.

The present invention reflects the discovery of a procedure for rapidly extracting dips and azimuths of fractures and formation beddings from the image data.

The technique of this invention significantly reduces the interpretation time for production geologists by automatically extracting these features or geometric parameters from borehole images. The inventive technique utilizes a Hough transform, as described in U.S. Pat. No. 3,069,654, issued Dec. 18, 1962 to P. V. C. Hough, for METHOD AND MEANS FOR RECOGNIZING COMPLEX PATTERNS; J. Illingworth and J. Kittler, "A Survey of the Hough Transform", Comput. Vision, Graphics, Image Process. 44 (1988), 87–116; and V. F. Leavers, "Which Hough Transform?", CVGIP: Image Understanding 58 (1993), no. 2, 250–264.

The Hough transform technique of this invention is robust to noise or gaps in the images. It can subsequently detect and characterize other geometric features (e.g., linear, circular, or ellipsoidal shapes). Some of these shapes may represent vugs in carbonate reservoirs present in the images.

In U.S. Pat. No. 5,162,994, issued to Torres on Nov. 10, 1992, for METHOD FOR DETERMINING DIP AND STRIKE ANGLES IN BOREHOLE ULTRASONIC SCANNING TOOL DATA, a method is illustrated for interpreting borehole data using Hough transforms. This patented method uses images obtained by the BoreHole TeleViewer (BHTV) or a Circumferential Acoustic Scanning Tool (CAST).

The present invention is significantly different from the method used in the aforementioned patent, and provides a much wider scope of improvement. The current invention improves the prior Hough transform method by:

a) using the edge slope/orientation information for further constraining the Hough transform;

b) iteratively using Hough transforms for detecting not only sinusoids, but also different geometric objects such as lines, circles, and ellipses; and c) smoothing the data to improve the accuracy of the Hough transform.

SUMMARY OF THE INVENTION

In accordance with the present invention, there is provided an improved method of interpreting borehole information utilizing a Hough transform technique. The method can detect planar structures such as fractures and formation beddings in the borehole, as well as geometric patterns such as elliptical vugs. The method comprises the steps of: a) detecting edges and their associated slopes in a target borehole image to provide information representative of planar structures, fractures and geometric patterns; b) preparing an accumulator array by specifying its ranges and array size; and c) processing said information to detect said planar structures, fractures and geometric patterns.

The method also includes the following steps wherein step (c) further includes tracing a curve for each detected edge, as a function of the depth in the borehole. The content of each array entry intersecting the curve can also be incremented. The accumulation can be repeated using a bow-tie technique. The accumulator array can then be smoothed using the Averaged Shifted Histograms (ASH) method. Thereafter, local maxima beyond a given threshold of the accumulator array can be detected, and a detected number of sinusoids can be specified. The edge data corresponding to the detected sinusoids is then removed and an accumulator array for ellipses is prepared by specifying a center coordinate and area or other unique parameters associated with the ellipse. A curve is then traced for each remaining edge point.

A content of each array intersecting the curve is then incremented. The bow-tie technique can be applied again. The accumulator array can be smoothed by the ASH procedure, whereafter the local maxima beyond the threshold in the accumulator array are detected. A detected number of ellipses is then specified. The entire process can be iterated further to detect any remaining geometric shapes in the image. The interpreted image information can then be recorded and applied to the drilling plan. The drilling plan can thus be modified, so that side boreholes can be drilled, and formations and fractures can be further explored for oil deposits.

It is an object of this invention to provide an improved borehole image interpretation method for the exploration of oil deposits within a borehole.

It is another object of the invention to provide an improved borehole image interpretation procedure that utilizes a Hough transform technique.

It is a further object of this invention to provide a borehole imaging technique that is more accurate, less sensitive to noise and that can interpret a wide variety of formations, fractures and anomalies within the borehole.

It is yet another object of the invention to provide a borehole imaging technique that can separate dips and azimuths of multiple fractures from those of formation boundaries automatically.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features an improved borehole image interpretation method that utilizes a Hough transform technique. The method can detect planar structures such as fractures and formation beddings in the borehole, as well as geometric patterns such as circular vugs.

Figure 1:
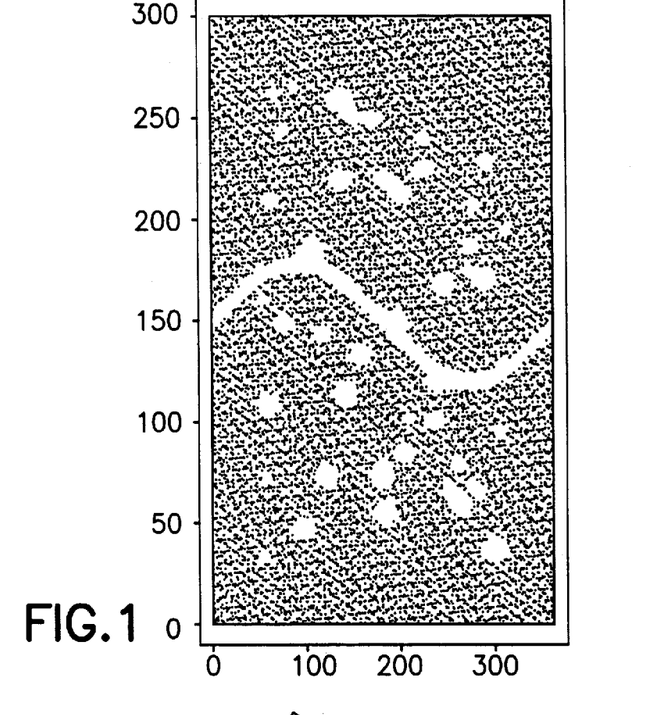
FIG. 1 depicts a characteristic view of a borehole image having a planar fracture and circular vugs.

Now referring to FIG. 1, a typical borehole image containing sinusoids and other geometric objects, such as circles, is illustrated. One must either (1) pick several points along these sinusoidal features (the workstation can then fit the best sinusoids based on these points), or (2) modify amplitudes and phase of sinusoids interactively on the workstation until a satisfactory fit is obtained.

The invention depicts a new approach for extracting dips and azimuths of multiple fractures and beddings automatically from any type of borehole image. This technique may significantly reduce the interpretation time for production geologists by automating extraction of dips and azimuths of planar dipping events from the borehole images. This technique, based on the Hough transform, is robust to noise or gaps in the images. The method can separate dips and azimuths of fractures from those of formations, and can subsequently detect and characterize other geometric features (e.g., linear, circular, or ellipsoidal shapes, some of which may represent vugs in carbonate reservoirs) present in the images.

Parametric Representation of a Planar Structure

Figure 2:
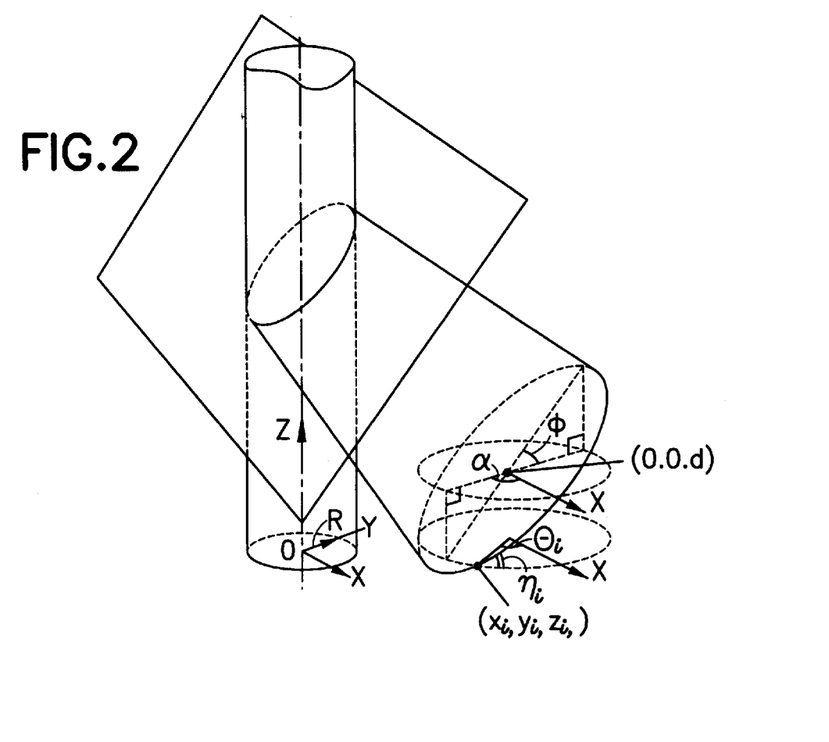
FIG. 2 illustrates a schematic diagram of a plane cutting through a circular cylinder representing a borehole.

Referring to FIG. 2, an illustration of a borehole is schematically represented by a circular cylinder. A plane cuts through the cylinder at a planar event to be analyzed. For simplicity, consider a planar fracture through the circular cylindrical wellbore of radius R.

First, fix the $R^3$ coordinate system with the origin at the center of the cylinder at the bottom of the wellbore. Let the x-axis represent the north direction and let the z-axis be the axis of this cylinder pointing upward. Any plane cutting this borehole can be written as:

$$ax + by + z = d \quad (1)$$

where (a, b, d) are real-valued parameters. The objective of the inventive method is to estimate these unknown parameters (a, b, d) using the information extracted from the borehole image taken along this cylindrical wall. Since (a, b, 1) is the normal vector of this plane, these parameters and dip $\phi$ (measured from horizontal or xy-plane) and azimuth $\alpha$ (measured from the x-axis) are related as follows:

$$\frac{\pi}{2} - \phi = \arctan\left(\frac{1}{\sqrt{a^2 + b^2}}\right) \text{ and } \alpha = \arctan\left(\frac{b}{a}\right), \quad (2)$$

$$(a, b) = (\tan\phi \cos\alpha, \tan\phi \sin\alpha).$$

Since any point (x,y,z) on the borehole wall or the cylinder surface can be specified by its z-coordinate and the azimuthal angle $\theta$ [that is, $(x,y,z)=(R\cos\theta, R\sin\theta, z)$], the intersection between the dipping plane (Equation 1) and the cylindrical borehole can be written as:

$$z = d - ax - by = d - aR\cos\theta - bR\sin\theta \quad (3)$$
$$= d - R\tan\phi \cos(\theta - \alpha)$$

which is a sinusoid when displayed in the $\theta z$-plane, as shown in FIG. 1. The amplitude of this sinusoid is $R \tan \phi$; therefore, the steeper the dipping plane is, the larger the amplitude gets. Also, the azimuth or strike angle $\alpha$ can be viewed as a phase shift of this sinusoid.

Elementary Geometric Information from Borehole Images

In the borehole images, the intersection of a dipping plane and a borehole is imaged differently (as anomaly) from the surrounding formation due to the difference in the physical properties (e.g., electrical conductivity for FMI, acoustic impedance for UBI, etc.) as shown in FIG. 1. In other words, for a fracture, this intersection is represented as a thin sinusoidal strip. The image values inside this strip are different from those of the surrounding formation. For a formation bedding, the intersection is represented as a sinusoid in the image. In this case, the image values above and below this sinusoid are different because of the difference in formation properties. In either case, the intersection in the image reveals such discontinuities or edges in the image values.

Therefore, using an edge detection technique such as the method shown by S. Mallat and S. Zhong, "Characterization of Signals from Multiscale Edges", IEEE Trans. Pattern Anal. Machine Intell. 14 (1992), no. 7, 710–732, a set of edge points (coordinates) of the intersection between the cylinder and the plane can be computed, $(t_i, y_i, z_i)$, where $i=1, 2, 3, \ldots, n$, where n depends on the measurement tool design. These points must satisfy Equation (3).

$$z_i = d - R \tan \phi \cos (\theta_i - \alpha) \qquad (4)$$

Moreover, the slopes or orientations of the edge points can be measured by first computing the edge gradients, then adding 90 degrees to the edge gradient direction. This edge orientation information is the key difference between our algorithm and the method proposed by the aforementioned U.S. Pat. No. 5,162,994.

Figure 3:
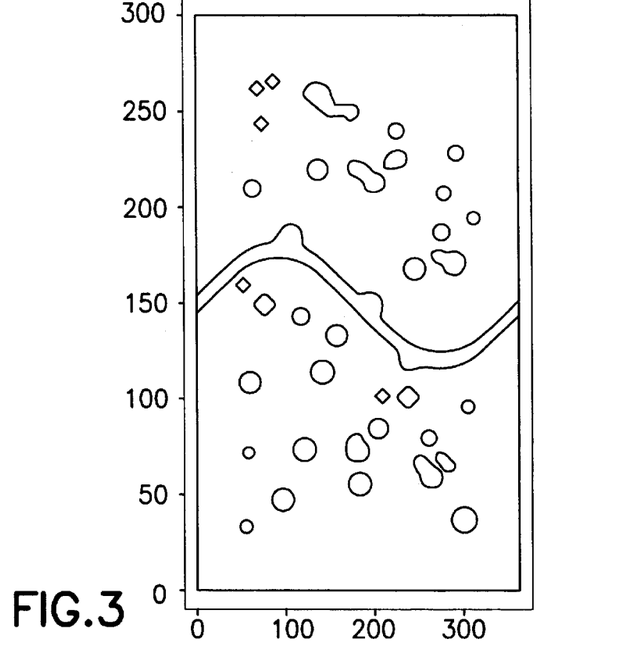
FIG. 3 shows a view of detected edges from the image depicted in FIG. 1.

Referring to FIG. 3, the detected edges of FIG. 1 are shown using the edge detection technique of Mallat and Zhong. Such orientation information further constrains Equation (4). This orientation vector can be computed easily since it is perpendicular to both the normal vector (a, b, 1) of the dipping event and the outward normal vector ($\cos \theta_i$, $\sin \theta_i$, 0) of the borehole wall at that intersecting point (see FIG. 2). Thus, the orientation vector can be written as:

$$(-\sin \theta_i, \cos \theta_i, \tan \phi \sin (\theta_i - \alpha)) \qquad (5)$$

After normalizing this vector to have a unit length, and representing it in the spherical coordinate system ($\cos \xi \cos \eta$, $\sin \xi \cos \eta$, $\sin \eta$), what is obtained is:

$$\tan \eta_i = \tan \phi \sin (\theta_i - \alpha) \qquad (6)$$

Equations (4) and (6) are the conditions which each edge information $(\theta_i, z_i, \eta_i)$ generated by the planar dipping event with ($\phi$, $\alpha$, d) must satisfy.

Figure 4:
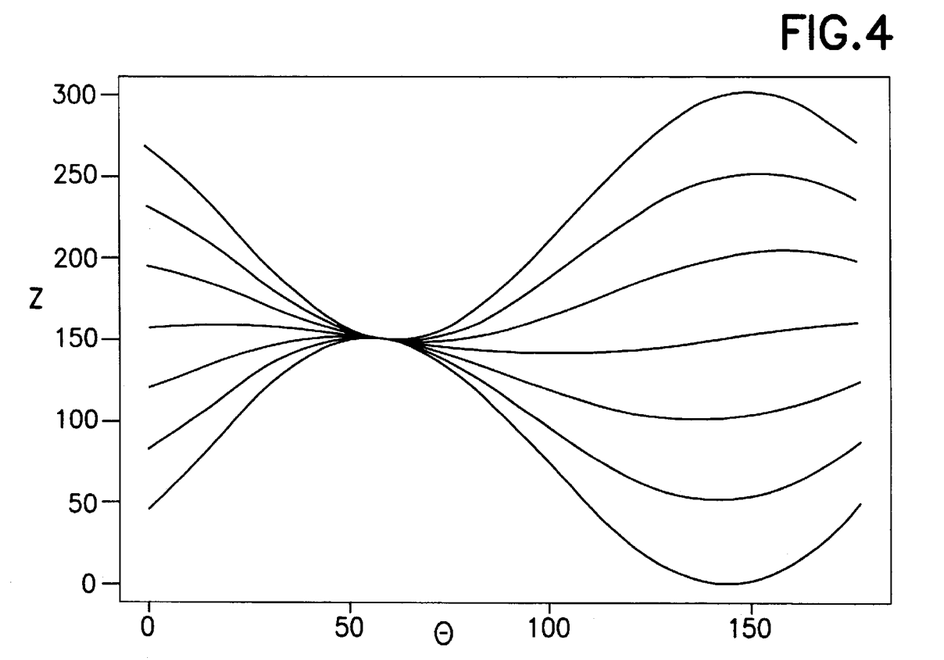
FIG. 4 illustrates a diagrammatic view of a family of sinusoids passing through an edge segment, depicted in FIG. 3.

There are three unknowns ($\phi$, $\alpha$, d) and two equations. This implies that, given a data point $(\theta_i, z_i, \eta_i)$, Equations (4) and (6) specify a curve in the 3D parameter space ($\phi$, $\alpha$, d). Or, equivalently, given ($\theta_i$, $z_i$, $\eta_i$), there is a family of sinusoids passing the point $(x_i, y_i, z_i) = (R \cos \theta_i, R \sin \theta_i, z_i)$ with the slope $\tan \eta_i$. FIG. 4 shows this family given a "needle" ($\theta_i$, $z_i$) with slope $\tan \eta_i$.

A straightforward calculation shows that this curve is a function of d as follows:

$$\phi(d) = \arctan\left(\sqrt{\left(\frac{d - z_i}{R}\right)^2 + \tan^2 \eta_i}\right) \qquad (7)$$

$$\alpha(d) = \begin{cases} \theta_i - \arctan\left(\dfrac{R \tan \eta_i}{d - z_i}\right) & \text{if } d < z_i, \\ \theta_i - \arctan\left(\dfrac{R \tan \eta_i}{d - z_i}\right) + \pi & \text{otherwise.} \end{cases} \qquad (8)$$

Given the whole edge data $\{(x_i, y_i, z_i, \eta_i)\}_{i=1, 2, 3, \ldots, n}$ or equivalently for the circular cylinder case, $\{(\theta_i, z_i, \eta_i)\}_{i=1, 2, \ldots, n}$ the most consistent ($\phi$, $\alpha$, d) satisfying Equations (7) and (8) should be found.

The Hough Transform

In order to obtain the most consistent set of parameters ($\phi$, $\alpha$, d) given the edge points with slopes $\{(\theta_i, z_i, \eta_i)\}_{i=1, 2, \ldots, n}$ use the so-called Hough transform which was originally developed to detect straight lines in images. This technique is essentially a "voting" or "evidence gathering" scheme: given a data point ($\theta_i$, $z_i$, $\eta_i$), vote for all possible sinusoids passing through ($\theta_i$, $z_i$) with the slope $\tan \eta_i$. Then accumulate the votes from all data points to get the desired parameters. This step is performed by preparing the so-called "accumulator array" $S(\phi_j, \alpha_k, d_l) = S(j, k, l)$ which is a discretized version of the 3D parameter space ($\phi$, $\alpha$, d). The array contents are initially set to 0. Then, the array contents are incremented at the point at which the curve determined by Equations (7) and (8)—given the data ($\theta_i$, $z_i$, $\eta_i$)—passes. Then iterate for the data points for $i = 2, 3, 4, \ldots, n$ and accumulate the votes. Thus, if there exists a sinusoid in the image, the corresponding element/cell of the accumulator array accumulates a great number of votes. Finally, select a maximum in the accumulator array to obtain the most consistent parameters representing that sinusoid.

The Hough transform can detect multiple sinusoids in an image. They are simply detected as local maxima/peaks in the accumulator array. Moreover, this technique is not sensitive to missing data or noise. This is a global voting process, so the local evidence accumulates to get the most consistent parameters. Thus, this is an ideal procedure for FMI-type data where the azimuthal coverage is not 360 degrees.

On the other hand, there are a few disadvantages to using this technique. An aliasing effect occurs due to the discretization process to form the accumulator array. Also, no accommodation is made for the uncertainty in the edge orientation measurements $\eta_i$. Finally, computational and storage requirements can be high depending on the size of the accumulator array.

Compensation of Uncertainty in Edge Orientations

The evidence-gathering scheme described above makes no accommodation for the probable uncertainty in edge orientation measurements. This uncertainty can arise from noise in the measurement process, irregularities in the formation itself, and any limitations in the adopted edge detection scheme. Uncertainty is a well known problem to those familiar with the Hough transform. The preferred method is, for each input data ($\theta_i$, $z_i$, $\eta_i$), to consider the family of slope perturbations ($\theta_i$, $z_i$, $\eta_i \pm m\delta$) for $m = 0, 1, 2, \ldots, B$ with B being a small integer and $\delta$ being small. Then simply gather evidence in the accumulator array for each member of this family. This scheme is called the "bow-tie" procedure because of the shape of this family of edges/needles.

Stable Voting Scheme by ASH

As briefly mentioned above, the discretization of the parameter space and noise in the data create difficulties in estimating accurate parameters (of sinusoids, in this case). As V. F. Leavers states, "a high count in a particular cell may be the combined effect of some insignificant peaks rather than a single significant peak. Moreover, a true peak may be split between several accumulator cells and not detected." Exactly the same problem occurs for a simple histogram computation: some points are split into two adjacent bins and high count bins may be an effect of having a wide bin width. D. W. Scott, in "Averaged Shifted Histograms: Effective Nonparametric Density Estimators in Several Dimensions", Ann. Statist. 13 (1985), no. 3, 1024–1040, proposed the method called Average Shifted Histograms (ASH) to compensate for this problem while keeping computational complexity low. This method is simple: form several histograms with equal bin widths but different bin locations (i.e., starting bin locations are shifted). Then average these shifted histograms. Computationally, this is equivalent to forming a histogram with a finer bin width followed by smoothing it with appropriate weights.

Therefore, this method eliminates the problems mentioned above. A smooth histogram can be obtained to search for local peaks in a computationally feasible and stable manner, applying this technique to the accumulator array.

Figure 5:
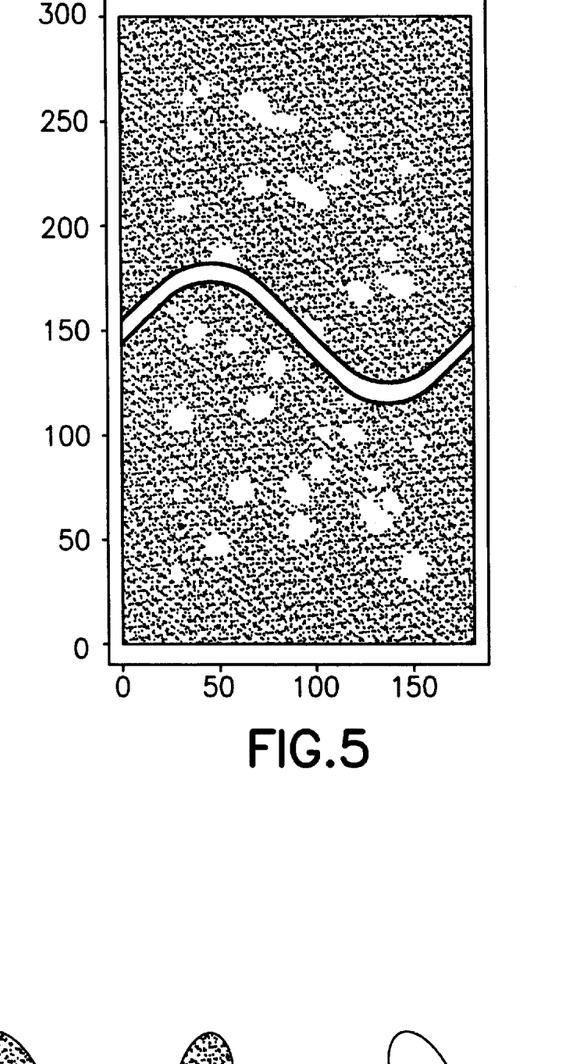
FIG. 5 shows a view of detected sinusoids using a Hough transform technique and ASH smoothing, as extracted from the image illustrated in FIG. 1.

Referring to FIG. 5, the detected sinusoids from the image in FIG. 1 are illustrated using the Hough transform with ASH. Note that the two sinusoids corresponding to the upper and lower fracture boundaries were detected.

Detection of Other Geometric Shapes

Figure 6:
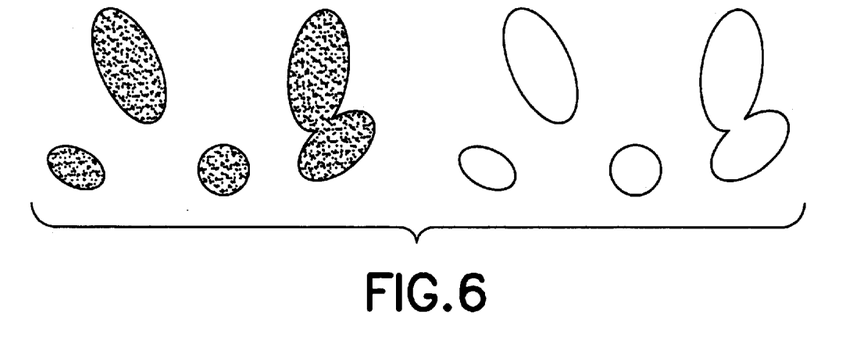
FIG. 6 shows a set of ellipsoidal shapes having diverse areas and orientations, and detected edges thereof.
Figure 7:
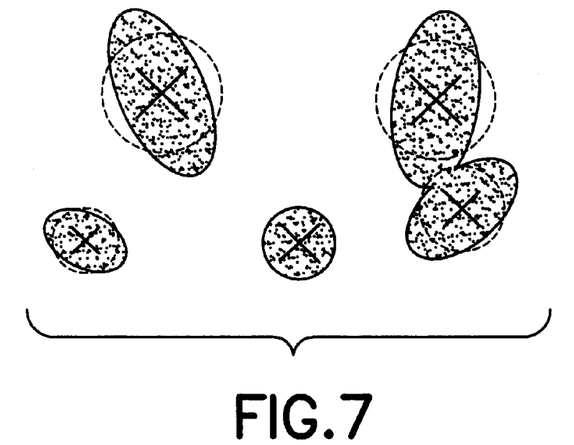
FIG. 7 depicts the set of ellipsoidal shapes shown in FIG. 6, in which the center of each shape is indicated, as well as a circle having the same area as each corresponding ellipse.

Once all of the sinusoids in the borehole image are detected, other features may still be left, and detectable, in the image. Important examples include vugs in carbonate rocks which are represented as circular or elliptic shapes in the images, as shown in FIG. 6. These shapes can be characterized by several parameters, including center position, area, orientation, and eccentricity. The inventive method can detect any combination of these parameters using the edge data, (FIG. 6, right side). For example, the method can obtain area and center position (FIG. 7) or obtain area versus orientation information.

Figure 8:
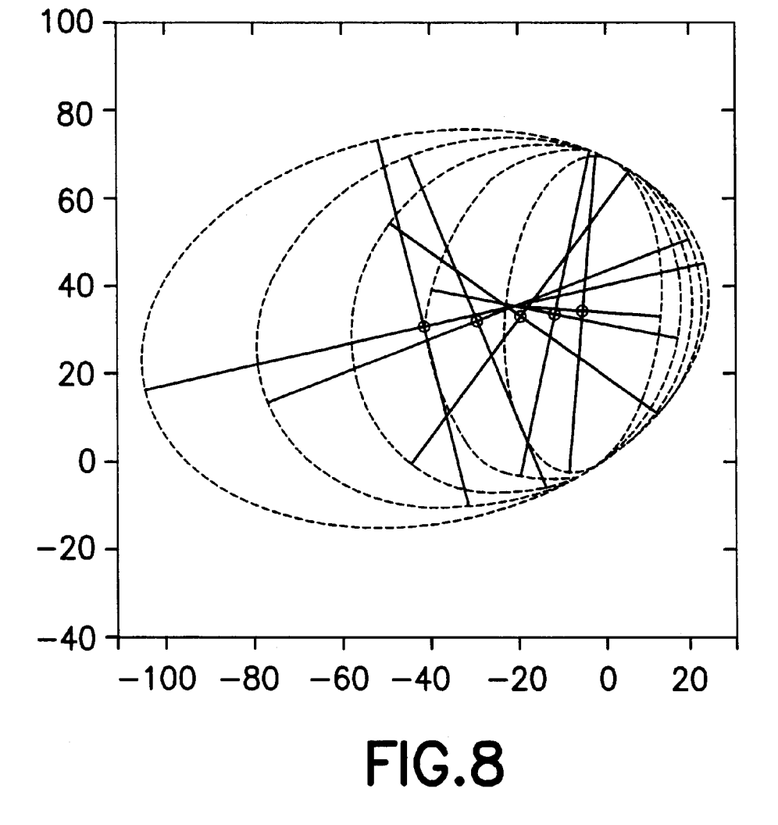
FIG. 8 illustrates a diagrammatic view of a family of ellipses tangent to two fixed line segments.

The method begins with parameterizing the family of ellipses which are tangent to two lines, shown in FIG. 8.

Let $P_1$ be the point $(x_1, y_1)$ and $P_2$ be the point $(x_2, y_2)$ with associated normal directions $(p_1, q_1)$ and $(p_2, q_2)$ which for definiteness are considered to point into the angular sector between the tangent lines containing the other point. That is $$p_1(x_2-x_1)+q_1(y_2-y_1)>0, \text{ and } p_2(x_1-x_2)+q_2(y_1-y_2)>0 \qquad (9)$$

The equation for the line $P_1P_2$ and the two tangents is given by $$L(x, y) \equiv \begin{vmatrix} x & y & 1 \\ x_1 & y_1 & 1 \\ x_2 & y_2 & 1 \end{vmatrix} = 0 \qquad (10)$$

This is clearly linear in x and y and is satisfied when P, namely (x, y), coincides with $P_1$ or $P_2$. It represents the line $P_1P_2$.

The tangent lines at $P_1$ and $P_2$ are given by $$l_1(x,y) \equiv p_1(x-x_1)+q_1(y-y_1)=0$$

and $$l_2(x,y) \equiv p_2(x-x_2)+q_2(y-y_2)=0$$

respectively.

The functions L, l1, and l2 are each linear in x and y and so, for given constant $\lambda$, $$C(x,y) \equiv L^2(x,y) - \lambda l_1(x,y) l_2(x,y) = 0 \qquad (11)$$

is quadratic in x, y, and so represents a conic section C. For $\lambda=0$, Equation (11) represents the (repeated) line L=0 (L for short), and for $\lambda=\infty$ the line pair $l_1(x,y)=0$ or $l_2(x,y)=0$ ($l_1$ and $l_2$). For other values of $\lambda$ it passes through the intersection of these degenerate conics. But this intersection consists of two pairs of coincident points, each with an associated tangent direction. The conic touches $l_1$ at $P_1$ and $l_2$ at $P_2$. C can be written in the form $$C(x,y)=ax^2+2hxy+by^2+2gx+2fy+c \qquad (12)$$

where a, b, c, f, g, h are linear functions of $\lambda$ and also depend on $x_1$, $y_1$, $p_1$, $q_1$, $x_2$, $y_2$, $p_2$, $q_1$.

Equation (12) can be written in the form $$x^T A x + 2 f^T x + c = 0 \qquad (13)$$

where x=(x,y) and f=(g,f) and A is the matrix $$A = \begin{pmatrix} a & h \\ h & b \end{pmatrix} \qquad (14)$$

The center $(x_0, y_0)$ can be introduced, so that Equation (13) may be written $$(x-x_0)^T A (x-x_0) = d$$

or $$x^T A x - 2 x_0^T A x + x_0^T A x_0 - d = 0 \qquad (15)$$

Comparing Equation (13) with Equation (15):

$$A x_0 = -f$$

giving $$x_0 = -A^{-1} f \qquad (16)$$

Then $$x_0^T A x_0 - d = f^T A^{-1} f - d = c$$

or $$d = f^T A^{-1} f - c.$$

The Range of $\lambda$ for Which the Conic is an Ellipse

Equation (15) represents a parabola if A is singular, since then the center $x_0$ is at infinity. It represents an ellipse, a hyperbola, or is vacuous, depending on whether (1/d)A is positive definite, indefinite, or negative definite.

Looking more closely at the quantities a, b, . . . h, from Equation (10), $$L(x,y)=(y_1-y_2)x+(x_2-x_1)y+x_1y_2-x_2y_1,$$

$$l_1(x,y)=p_1x+q_1y-p_1x_1-q_1y_1,$$

$$l_2(x,y)=p_2x+q_2y-p_2x_2-q_2y_2.$$

It follows that $$a(\lambda)=(y_1-y_2)^2-\lambda p_1 p_2,$$

$$b(\lambda)=(x_2-x_1)^2-\lambda q_1 q_2,$$

$$c(\lambda)=(x_1y_2-x_2y_1)^2-\lambda(p_1x_1+q_1y_1)(p_2x_2+q_2y_2),$$

$$f(\lambda)=(x_1y_2-x_2y_1)(x_2-x_1)+\tfrac{1}{2}\lambda[q_1(p_2x_2+q_2y_2)+q_2(p_1x_1+q_1x_1)],$$

$$g(\lambda)=(x_1y_2-x_2y_1)(y_1-y_2)+\tfrac{1}{2}\lambda[p_1(p_2x_2+q_2y_2)+p_2(p_1x_1+q_1y_1)],$$

$$h(\lambda)=(y_1-y_2)(x_2-x_1)-\tfrac{1}{2}\lambda(p_1q_2+p_2q_1). \quad (17)$$

Now examine the signs of the terms $L^2$ and $l_1l_2$ in Equation (11). $L^2$ is positive except on the line L, where it is zero. Because of Equation (9) the product $l_1l_2$ is positive for x in the sector between $l_1$ and $l_2$ containing the segment $P_1P_2$. Hence, if $\lambda<0$ (Equation (11)) is not satisfied for any x in that sector or in the opposite sector, where also $l_1l_2>0$. But these sectors separate the plane into two separated domains.

Thus for $\lambda<0$ any conic touching $l_1$ and $l_2$ must have two separated components and is thus a hyperbola. Hence, only positive values of $\lambda$ need be considered. When $\lambda$ is small and positive, the conic is close to the line segment $P_1P_2$, to which it tends as $\lambda \to 0$.

When $\lambda=0$, the matrix A is singular; but as $\lambda$ increases, A at first becomes positive definite and then becomes singular (indefinite) again for a positive value $\lambda_0$ of $\lambda$.

For $\lambda$ larger than $\lambda_0$, A becomes indefinite. This corresponds to the center of the ellipse at first receding to infinity, so that the ellipse tends to a parabola for $\lambda=\lambda_0$, and then, for $\lambda>\lambda_0$, the conic becomes a hyperbola, but this time within the sectors for which $l_1l_2$ is positive.

Thus, the range of $\lambda$ for which the conic C of Equation (11) is an ellipse is the interval $0<\lambda<\lambda_0$. Solving for $\lambda$:

$$\det(A) = \begin{vmatrix} a & h \\ h & b \end{vmatrix}$$

$$= \begin{vmatrix} (y_1-y_2)^2 - \lambda p_1 p_2 & (y_1-y_2)(x_2-x_1) - \\ & \tfrac{1}{2}\lambda(p_1q_2+p_2q_1) \\ (y_1-y_2)(x_2-x_1) - & (x_2-x_1)^2 - \lambda q_1 q_2 \\ \tfrac{1}{2}\lambda(p_1q_2+p_2q_1) & \end{vmatrix}$$

$$= 0$$

One root is zero; the other is the required value $\lambda_0$ given by $$\lambda_0 = \frac{4[p_1(x_2-x_1)+q_1(y_2-y_1)][p_2(x_1-x_2)+q_2(y_1-y_2)]}{(p_1q_2-p_2q_1)^2}$$

Thus, the conic C of Equation (11) represents an ellipse if and only if $$0 < \lambda < \frac{4[p_1(x_2-x_1)+q_1(y_2-y_1)][p_2(x_1-x_2)+q_2(y_1-y_2)]}{(p_1q_2-p_2q_1)^2} \quad (18)$$

For $\lambda$ in this range one may calculate the coordinates of the center of the ellipse, $(x_0(\lambda), y_0(\lambda))$, (see Equation (16)), the lengths of the major and minor axes $$\rho_1(\lambda) = 1/\sqrt{\kappa_2} \quad (19)$$

$$\rho_2(\lambda) = 1/\sqrt{\kappa_1} \quad (20)$$

where $\kappa_1 > \kappa_2$ are the eigenvalues of A/d, and the orientation of the axes $$\beta(\lambda) = \frac{\arctan(d\kappa_2 - a)}{h} \quad (21)$$

where the matrix A is given in Equation (14) and $a(\lambda)$, $b(\lambda)$ and $h(\lambda)$ given in Equation (17).

Given any pair of edges, the methodology outlined in this section obtains a parameterization for the family of ellipses, specified in Equations (16), (20), and (21), to which these edges are tangent. This family is illustrated in FIG. 8.

Thus, given a collection of ellipse parameters or features which may be computed from these parameters, such as area, the method allows specification of a parameterization for these features.

For example, this collection of ellipse features might consist of center position and area. In this case, three equations could be prepared for this selection of ellipse parameters as functions of X using Equations (16), (20), and (21). The first two equations could specify the center position. Referring to Equations (19) and (20), the third equation could be depicted as $$\text{area}(\lambda)=\pi\rho_1(\lambda)\rho_2(\lambda)$$

The Algorithm

Step 0. Detect edges and their slopes $\{(\theta_i, z_i, \eta_i)\}_{i=1}^n$ in the target borehole image.

Step 1. Prepare the accumulator array $S(\phi_j, \alpha_k, d_l)=S(j,k,l)$: specify ranges of $\phi$, $\alpha$, d and array size by $\phi_j=\phi_0+j\Delta\phi$, $j=1, 2, 3, \ldots, J$; $\alpha_k=\alpha_0+k\Delta\alpha$; $k=1, 2, 3, \ldots, K$; $d_l=d_0+l\Delta d$; $l=1, 2, 3, \ldots, L$. Then initialize the array contents to 0.

Step 2. For each edge point $(\theta_i, z_i, \eta_i)$, trace the curve specified by Equations (7) and (8). For each array element $S(j,k,l)$ which this curve intersects, increment its content. That is, $S(j,k,l)=S(j,k,l)+1$. Then apply the bow-tie procedure. Repeat this accumulation process for $(\theta_i, z_i, \eta_i \pm m\delta)$, $m=1, 2, 3, \ldots, B$ after specifying $\delta$ and B.

Step 3. Smooth the accumulator array by the ASH procedure.

Step 4. Detect the local maxima beyond some threshold in the accumulator array. Suppose $\{(j_m, k_m, l_m)\}_{m=1}^M$ are the indices of such local maxima. Then the detected M sinusoids are specified by $\{(\phi_0+j_m\Delta\phi, \alpha_0+k_m\Delta\alpha, d_0+l_m\Delta d)\}_{m=1}^M$.

Step 5. Remove all edge data $(\theta_i, z_i, \eta_i)$ corresponding to the detected sinusoids.

Step 6. Choose which combination of ellipse parameters, $\bar{v}=(v_1, v_2, \ldots, v_p)$ to detect. For example, this combination might consist of area as $v_1$ and orientation as $v_2$; or might consist of center position as $v_1$ and $v_2$, and area as $v_3$.

Step 7. Prepare p equations for this selection of ellipse parameters as functions of $\lambda$ using Equations (16), (20), and (21).

Step 8. Specify ranges of $v_j$, i.e., $v_{j,start}$ and $v_{j,end}$ for $j=1, 2, \ldots, p$, and specify array sizes for $R_j$, for $j=1, 2, \ldots, p$. Finally, prepare accumulator array $S(v_{1,k_1}, v_{2,k_2}, \ldots v_{p,k_p})=S(k_1, k_2, \ldots, k_p)$ by specifying $v_{j,k_j}=v_{j,start}+k_j\Delta_j$, where $\Delta_j=(v_{j,end}-v_{j,start})/R_j$ and $k_j=0,1,\ldots, R_j$ and $j=1, 2, \ldots, p$.

Step 9. For each pair of remaining edge points $(\theta_i, z_i, \eta_i)$, trace the curve specified by the equations of step 7 and the parameter range for λ given in Equation (18). For each array element $S(k_1, k_2, \ldots, k_p)$ intersecting this curve, increment its content, $S(k_1, k_2, \ldots, k_p) = S(k_1, k_2, \ldots, k_p)+1$.

Step 10. Apply the bow-tie procedure again.

Step 11. Smooth the accumulator array by the ASH procedure.

Step 12. Detect the local maxima beyond some threshold in the accumulator array. Suppose $\{(k_{1,m}, k_{2,m}, \ldots, k_{p,m})\}_{m=1}^{M'}$ are the indices of such local maxima. Then the detected M' ellipse parameter features are $\{(v_{1,start}+k_{1,m}\Delta_1, v_{2,start}+k_{2,m}\Delta_2, \ldots, v_{p,start}+k_{p,m}\Delta_p)\}_{m=1}^{M'}$.

It is clear that this algorithm can be iterated further to detect remaining geometric shapes in the image, if any.

Parametric Representation of a Planar Structure Intersecting with an Elliptic Cylinder Parametric equations representing a planar structure intersecting along with a borehole with elliptic cross section are shown herein. Such a borehole shape is often created by the anisotropic stress of subsurfaces.

Suppose the borehole is represented by an equation:

$$\frac{(x\cos\psi + y\sin\psi)^2}{s^2} + \frac{(-x\sin\psi + y\cos\psi)^2}{t^2} = 1. \quad (11)$$

If s>t, then this is an elliptic cylinder with the semi-major axis s and the semi-minor axis t and orientation of the major axis is ψ relative to the x-axis. As before, a planar structure (a fracture or a formation bedding) is represented by Equations (1) with (2).

$$(\tan\phi\cos\alpha)x + (\tan\phi\sin\alpha)y + z = d \quad (12)$$

Let $(x_i, y_i, z_i)$ be a point on the intersection between this planar structure with the elliptic cylinder. Then $(x_i, y_i, z_i) = (R_i \cos\theta_i, R_i \sin\theta_i, z_i)$ must satisfy $$z_i = d - R_i \tan\phi \cos(\theta_i - \alpha) \quad (13)$$

Note that now $R_1$ in this equation depends on the intersecting point. As for the constraint by the edge orientation information, consider a tangent plane to this elliptic cylinder at the point $(x_1, y_i, z_i)$. Then this tangent plane is described by:

$$\rho_i x + \sigma_i y = 1 \quad (14)$$

where $$\rho_i = \left(\frac{\cos^2\psi}{s^2} + \frac{\sin^2\psi}{t^2}\right)x_i + \cos\psi\sin\psi\left(\frac{1}{s^2} - \frac{1}{t^2}\right)y_i,$$

$$\sigma_i = \cos\psi\sin\psi\left(\frac{1}{s^2} - \frac{1}{t^2}\right)x_i + \left(\frac{\sin^2\psi}{s^2} + \frac{\cos^2\psi}{t^2}\right)y_i.$$

Now consider the intersection between this tangent plane and the planar structure, Equation (12). This intersection is clearly a straight line in the (x,y,z)-space, and the edge orientation vector parallel to this straight line can be computed in a straightforward manner:

$$(-\sigma_i, \rho_i, \tan\phi(\sigma_i \cos\theta - \rho_i \sin\alpha)) \quad (15)$$

Note that in the circular case, (s=t=R and ψ=0), the edge orientation vector, Equation (15), coincides with Equation (5) relative to a constant factor. Similarly to the derivation of Equation (6), $$\tan\eta_i = \frac{\tan\phi}{\sqrt{\rho_i^2 + \sigma_i^2}}(\sigma_i\cos\alpha - \rho_i\sin\alpha) \quad (16)$$

$$= \tan\phi\sin(\beta_i - \alpha),$$

where $\beta_i = \arctan(\sigma_i/\rho_i)$. Equations (13) and (16) consist of the parametric equation for the plane intersecting with the elliptic cylinder. Unlike the circular case, it is difficult to express θ and α as explicit functions of d, so when implementing the method in this case, a simple numerical solver is required.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for detecting planar structures such as fractures and formation beddings in a borehole, as well as geometric patterns such as elliptical vugs from a borehole image using a Hough transform technique, comprising the steps of:

a) detecting edges and their associated slopes in a borehole image to obtain edge slope/orientation information;

b) preparing an accumulator array by specifying its ranges and array size; and c) using said edge slope/orientation information for further constraining the Hough transform.

2. The method in accordance with claim 1, further comprising the steps of:

d) tracing a curve for each detected edge, as a function of depth of said borehole; and e) incrementing a content of each array intersecting the curve.

3. The method in accordance with claim 2, further comprising the step of:

f) repeating accumulation using a bow-tie technique.

4. The method in accordance with claim 3, further comprising the step of:

g) smoothing said accumulator array using an Averaged Shifted Histograms (ASH) method.

5. The method in accordance with claim 4, further comprising the step of:

h) detecting local maxima beyond a given threshold of the accumulator array, wherein a detected number of sinusoids can be specified.

6. The method in accordance with claim 5, further comprising the steps of:

i) removing edge data corresponding to the detected sinusoids;

j) preparing an accumulator array for ellipses.

7. The method in accordance with claim 6, further comprising the steps of:

k) tracing a curve for each remaining edge point; and l) incrementing a content of each array element intersecting said curve.

8. The method in accordance with claim 7, further comprising the step of:

m) applying said bow-tie technique again.

9. The method in accordance with claim 8, further comprising the step of:

n) smoothing said accumulator array by an ASH procedure.

10. The method in accordance with claim 9, further comprising the step of:

o) detecting local maxima beyond a threshold in the accumulator array.

11. The method in accordance with claim 10, further comprising the step of:

p) iterating said method further to detect any remaining geometric shapes in the borehole image.

12. The method in accordance with claim 11, further comprising the step of:

q) interpreting image information.

13. A method for detecting planar structures such as fractures and formation beddings in a borehole, as well as geometric patterns such as elliptical vugs from a borehole image using a Hough transform technique, comprising the steps of:

a) detecting edges and their associated slopes in a borehole image to obtain edge slope/orientation information;

b) preparing an accumulator array by specifying its ranges and array size;

c) tracing a curve for each detected edge, as a function of depth of said borehole; and d) incrementing a content of each array intersecting the curve.

* * * * *